(12) United States Patent  (10) Patent No.: US 7,681,354 B2
Shepardson  (45) Date of Patent: Mar. 23, 2010

(54) TREE AND PLANT WATERING SYSTEM

(75) Inventor: Heather Ann Shepardson, Denver, CO (US)

(73) Assignee: Ever-Green Watering Systems, LLC, Denver, CO (US)

( * ) Notice: Subject to any disclaimer, the term of this patent is extended or adjusted under 35 U.S.C. 154(b) by 944 days.

(21) Appl. No.: 10/954,673

(22) Filed: Sep. 30, 2004

(65) Prior Publication Data

US 2006/0065318 A1    Mar. 30, 2006

(51) Int. Cl.
*A01G 27/00*  (2006.01)
*A47G 33/12*  (2006.01)
(52) U.S. Cl. ......................... 47/40.5; 47/48.5
(58) Field of Classification Search ................. 47/40.5, 47/62 R, 79, 48.5
See application file for complete search history.

(56) References Cited

U.S. PATENT DOCUMENTS

| | | | |
|---|---|---|---|
| 1,383,368 A | 7/1921 | Ambrose | |
| 1,453,401 A * | 5/1923 | Mattson | ...................... 137/862 |
| 1,842,687 A | 1/1932 | Reynolds | |
| 3,137,969 A | 6/1964 | Sokol | |
| 3,438,575 A | 4/1969 | Rohling | |
| 3,697,026 A | 10/1972 | Hambrick | |
| 3,754,352 A | 8/1973 | Bates | |
| 3,856,205 A | 12/1974 | Rohling | |
| 3,900,134 A | 8/1975 | Larson | |
| 4,060,934 A | 12/1977 | Skaggs | |
| 4,121,608 A | 10/1978 | MacLeod | |
| 4,148,155 A | 4/1979 | Allen | |
| 4,291,836 A | 9/1981 | Chen-Hsiung | |
| 4,300,311 A | 11/1981 | Marchant | |
| 4,321,937 A | 3/1982 | Littlehale | |
| 4,447,983 A | 5/1984 | Shinada | |
| 4,542,762 A | 9/1985 | Littlehale | |
| 4,578,897 A | 4/1986 | Pazar et al. | |
| 4,653,224 A | 3/1987 | Weckesser | |
| 4,760,666 A | 8/1988 | Han | |
| 4,825,587 A | 5/1989 | Stancil | |
| 4,848,029 A | 7/1989 | Han | |
| 4,930,252 A | 6/1990 | Krause et al. | |
| 4,993,176 A | 2/1991 | Spinosa | |
| 5,076,009 A | 12/1991 | Cibor | |
| 5,090,443 A | 2/1992 | Jacobsen | |
| D329,027 S | 9/1992 | Kodra | |
| 5,157,868 A | 10/1992 | Munoz | |
| 5,279,071 A | 1/1994 | McDougall | |
| 5,369,910 A | 12/1994 | Copenhaver | |
| 5,473,837 A | 12/1995 | Skoczylas et al. | |
| 5,522,179 A | 6/1996 | Hollis | |
| 5,596,839 A | 1/1997 | Ellis-El | |
| 5,779,215 A | 7/1998 | DeMasi | |
| 6,145,250 A | 11/2000 | Mai | |
| 6,327,816 B1 | 12/2001 | Walterscheid | |
| 6,497,071 B1 * | 12/2002 | Main et al. | .................. 47/40.5 |

* cited by examiner

*Primary Examiner*—T. Nguyen
(74) *Attorney, Agent, or Firm*—Holland & Hart LLP

(57) ABSTRACT

Kit and apparatus for watering a Christmas tree or other plant supported in a stand with a water receptacle.

12 Claims, 10 Drawing Sheets

TREE AND PLANT WATERING SYSTEM

FIELD OF THE INVENTION

The present invention relates generally to a watering system for trees and other plants, and more particularly to a watering system for Christmas trees and other plants.

BACKGROUND OF THE INVENTION

Numerous situations occur in which it is desirable to provide a constant source of water to growing plants. Perhaps the most common of these situations is the Christmas tree, which is a key part of the traditional celebration of the Christmas holiday season. A tree is usually supported in a stand with a mechanism for holding the tree upright and a water reservoir. The base of the tree and the stand may be made more attractive with a skirt that surrounds the tree. Typically, in a home, wrapped, unopened gifts are placed around the base of the tree prior to Christmas day. In commercial settings, attractively wrapped boxes that simulate wrapped presents are often placed about the base of the tree.

Evergreen trees are usually cut some time prior to the holiday season for use as Christmas trees, and they tend to dry out during storage and display. In addition, if the cut end of the tree trunk is not immersed in water, a seal of resin will form over the end, and the tree will not be able to absorb water through the cut end. If a tree becomes too dry, it can present a fire hazard. In addition, needles drop off branches as the tree dries out, resulting in a messy accumulation of needles under the tree and a loss of the esthetic character of the tree. Thus, it is desirable to provide water to the tree to help prevent excessive drying of the tree. An average tree consumes between a quart and a gallon of water per day, and will dry out quickly if water is not provided. Although most Christmas tree stands include a bowl or receptacle that can be filled with water for absorption through the tree trunk, low tree branches extending outward from the tree trunk and stacked gifts around the base of the tree often make it difficult to access the water receptacle for refilling and replacing the water that evaporates and is taken up by the tree.

A number of watering systems have been described previously that can be located some distance away from the base of the tree and include a conduit for transporting water to a receptacle in the tree stand. Many of these systems include electrically operated pumps and/or valves which require connection to an electrical outlet via a cord between the device and the outlet. Extending a cord between the tree and a wall can create a tripping safety hazard, and it may also limit where a tree can be placed in a room if the tree must be located fairly close to an electrical outlet. In some homes, as well as in some commercial settings, it may be desirable to place a tree further away from an outlet or even in the middle of a room, such as in the lobby of a commercial building. In addition, there are potential hazards from short circuits if water is spilled or if a spark ignites a somewhat dry tree or an accumulation of dry needles.

Other watering systems have been described that do not require connection to a source of electricity, but they include special tree stands and/or specialized hardware or parts for proper function. Examples of such specialized parts include protective sleeves and side guards to prevent crushing of the conduit, metal rods that prevent the end of the conduit from resting on the bottom of the water receptacle in the tree stand, and rigid tubes extending from the end of a hose and into the water receptacle in the stand. In some cases, the conduit extends between the top of a water reservoir and the top of the tree stand, such that the conduit does not rest on the floor. In this case, the conduit may be unsightly because it is not hidden behind or under gift boxes and/or a decorative skirt that surrounds the base of the tree and the tree stand.

There also are devices with reservoirs shaped like holiday symbols, such as Santa boots and snowmen. However, these symbols tend to be less formal than the typical assortment of wrapped presents under a tree, and they may not fit into the desired decor and visual effect of the tree and/or the surrounding environment, particularly in an elegant setting.

SUMMARY OF THE INVENTION

One embodiment of the present invention comprises a kit for an apparatus for delivering water to a plant that is supported in a receptacle. Preferably, the plant is supported without soil. The kit comprises a water-tight reservoir having a base, at least one wall joined to the base, an open top, and an outlet port passing through one of the walls adjacent the joint between the wall and the base. The kit also comprises a conduit having a first end for attaching to the outlet port and a second end, means for retaining the second end of the conduit within the receptacle when the reservoir is spaced apart from the receptacle, and a lid for the reservoir. In addition, the reservoir and/or the lid may have an exterior including features resembling a wrapped gift, such as a Christmas present. The features may be selected from patterns, textures, ribbons, and combinations thereof. Optionally, the kit may include a bow or other ornament and means for attaching the ornament to the lid. Further, the means for retaining may comprise a clip with a base to which an adhesive has been applied and/or a retaining loop sized to fit around the exterior of the conduit and hold the conduit in place without impeding fluid flow through the conduit. The retaining loop may be adjustable between a first inner diameter larger than the outer diameter of the conduit and a second inner diameter approximately the same as the outer diameter of the conduit.

Another embodiment of the present invention comprises an apparatus for delivering water to a plant in a receptacle in which the plant is supported, preferably without soil. The apparatus comprises a water-tight reservoir having a base, at least one wall, and an open top, wherein the base and the walls are water-tightly sealed to each other. The reservoir further comprises an outlet port passing through one of the walls adjacent the joint between the wall and the base, a flexible conduit having a first end attached leakproofably to the outlet port and a second end extending into the receptacle, means for retaining the second end of the conduit within the receptacle such that the second end is positioned near the bottom of the interior of the receptacle, a reservoir lid covering the open top of the reservoir, and a bow attached to the reservoir lid. The reservoir and lid each include exterior features, such as indicia for lining up and accommodating ribbon, patterns, textures, and combinations thereof, to make the reservoir and lid resemble a wrapped gift, such as a Christmas present. In addition, the means for retaining may comprise a clip having an adhesive surface for attachment to the receptacle and a retaining loop sized to fit around the exterior of the conduit and hold the conduit in place without impeding fluid flow through the conduit.

Another embodiment of the present invention comprises an apparatus for delivering water to a plant in a receptacle. The apparatus consists essentially of a water-tight reservoir spaced apart from the receptacle, an outlet port passing through one of the walls adjacent a joint between a wall and the reservoir base and having an extension external to the reservoir, a conduit having a first end leakproofably sealed around the outlet port extension and a second end extending into the receptacle, means for retaining the conduit within the receptacle with the second end of the conduit extending to a position near the bottom of the interior of the receptacle, wherein the means for retaining is adhered to the receptacle and loosely surrounds the conduit; and a lid covering the open top of the reservoir. The walls are leakproofably joined to the base and to each other. The apparatus may additionally include features such that the reservoir resembles a wrapped gift, such as a Christmas present. The plant may be supported in the receptacle without using soil.

BRIEF DESCRIPTION OF THE DRAWINGS

These and other features, aspects, and advantages of the present invention will become better understood with reference to the following description, appended claims, and accompanying drawings, where:

FIG. 3 is a cross sectional view of a conduit and an attachment clip in accordance with the present invention, where

DETAILED DESCRIPTION OF THE INVENTION

In accordance with the present invention, a watering system is provided for plants that are located in containers, thus needing a virtually constant supply of water. The system is particularly suited for providing water to a Christmas tree that is positioned in a stand that includes a water receptacle. The following discussion describes use of the present invention with Christmas trees, but the invention could easily be used in other situations where it is desired to supply water from a remote reservoir to another type of plant in a container or receptacle. Generally, the plant will be anchored in the container without soil.

Figure 1:
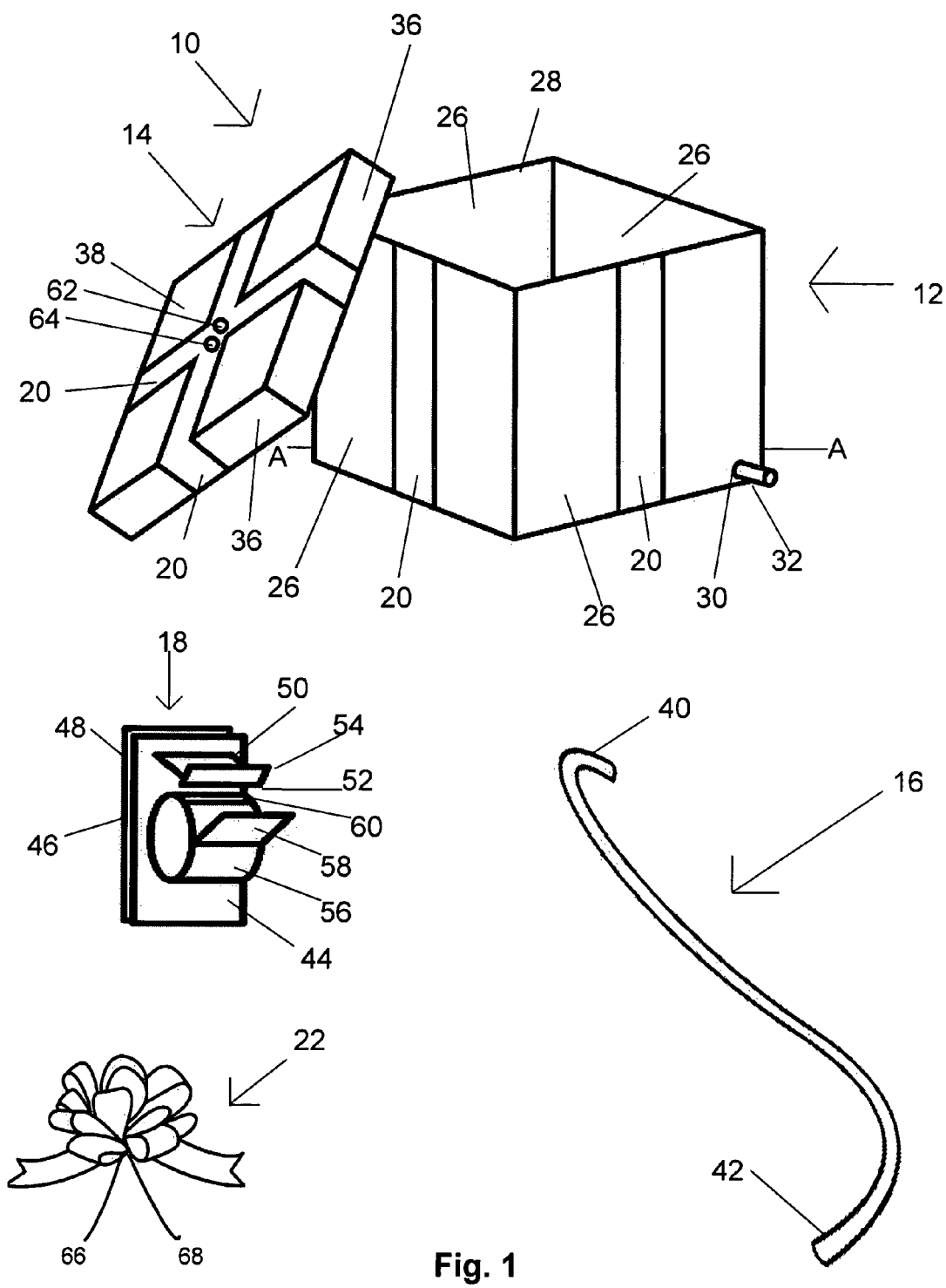
FIG. 1 is a perspective view of a kit in accordance with the present invention.

In one embodiment of the present invention, a kit 10 is provided that includes the necessary components of the watering system. The kit is illustrated in FIG. 1 and includes a reservoir 12, a reservoir lid 14, a conduit 16, and an attachment device 18 that can be adhered to a Christmas tree stand or other water receptacle in which a plant or plants are located. Optionally, the kit may include one or more additional items, such as ribbon 20 and bow 22 to provide the appearance of a wrapped gift when the kit is assembled.

Figure 2:
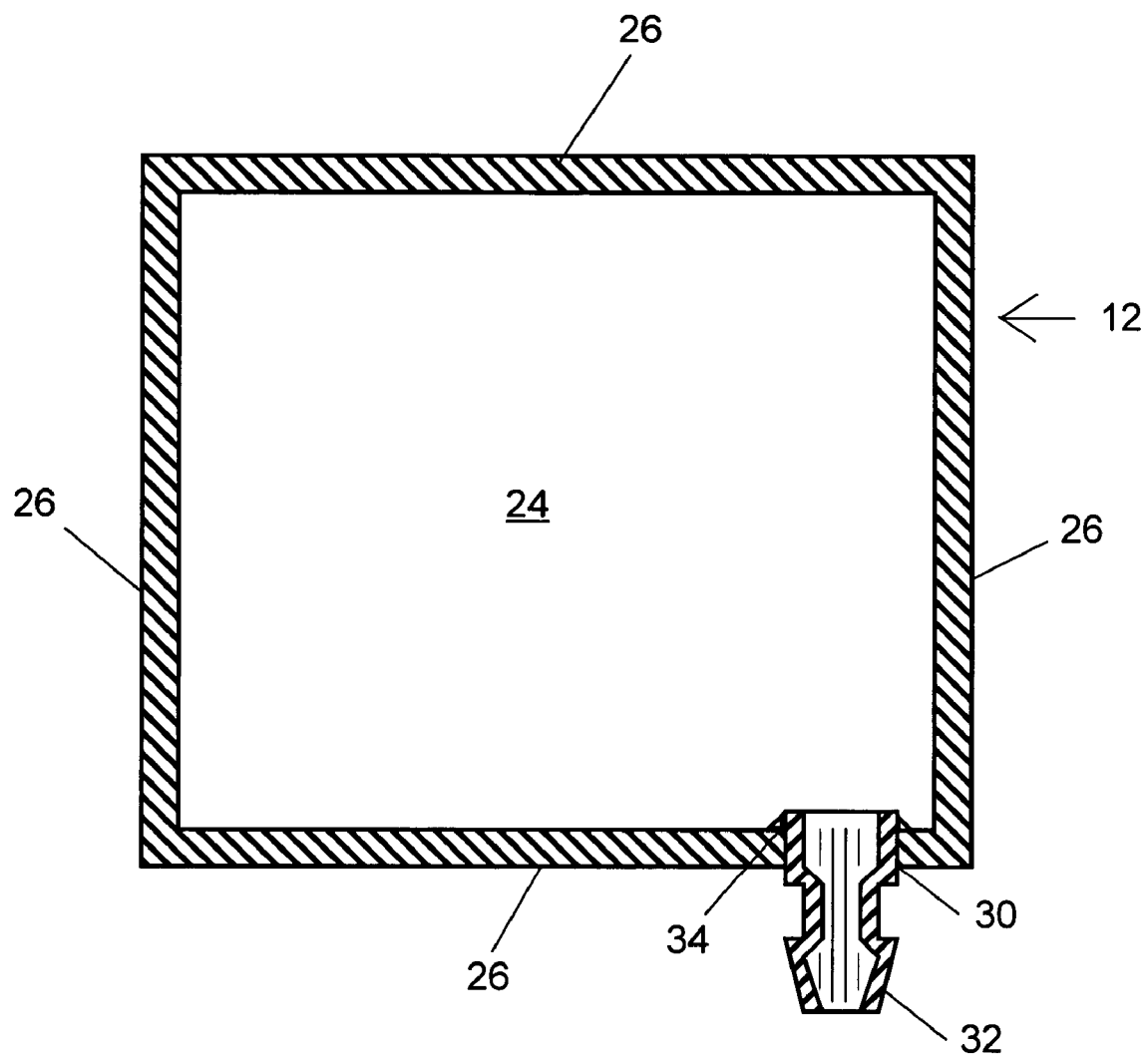
FIG. 2 is a cross sectional view from above the reservoir of FIG. 1 along line A-A.

Reservoir 12 has a base 24 and at least one side wall 26 sealed to each other to form a water-tight structure with a top opening 28. As shown, reservoir 12 is cubical with four walls, but it could have any shape that will hold a suitable quantity of water and that has a wall or walls high enough to provide for fluid flow from the reservoir to the receptacle, as described below. For example, the reservoir could be a cylinder and have only one wall, or it could have a multi-sided base and a corresponding number of walls. Referring to FIG. 2, an opening 30 in one wall 26, near the bottom of reservoir 12, provides for fluid flow out of the reservoir 12. Opening 30 extends through the wall 26, and port 32 is formed to allow easy, leak-proof attachment of a flexible conduit or hose, such as conduit 16. A suitable glue or sealant 34 may be used to secure port 32 within opening 30 and also to provide a water-tight seal between port 32 and wall 26. One suitable type of port is a translucent white or opaque black nylon single barbed tube fitting for ¼ inch inner diameter hose or tubing, available from McMaster Carr, P.O. Box 740100, Atlanta, Ga. 30374-0100 or 6100 Fulton Industrial Blvd., Atlanta, Ga. 30336-2852 or via the website http://www.mcmaster.com/, for use with PVC and polyurethane tubing and having a durometer of 75 A-80 A. The port can be glued in place to form a water-tight seal with the wall 26 of reservoir 12, using any suitable waterproof and water-tight glue, as indicated by seal 34 in FIG. 2. Alternatively, the reservoir can be molded as a single piece (not shown), with a port integral with the reservoir wall, or it can have a threaded opening, with a suitable fitting, such as an externally threaded hose barb, screwed into the opening (not shown). Also alternatively, the port and the reservoir may be separate pieces in the kit.

Reservoir lid 14 is formed to fit onto the top of reservoir 12, with side portions 36 sealed to top portion 38. Preferably, the side portions 36 of lid 14 fit snugly around the walls 26 of reservoir 12, so that lid 14 fits snugly onto reservoir 14, with the top portion 38 slightly larger than the space defined within walls 26 of the reservoir, and the side portions 36 of lid 14 extending around the exterior of walls 26. The relatively tight fit between lid 14 and reservoir 12 helps to prevent removal by small children and pets. However, lid 14 need not provide an airtight seal over reservoir 12.

Conduit 16 is a flexible tube or hose, with an inner diameter that will engage tightly around port 32, first end 40, and second end 42. Because it is desirable to have as simple a system as possible for providing water to a Christmas tree or other plant, conduit 16 should preferably have sufficient structural rigidity to prevent the conduit from kinking and collapsing during use, particularly when the conduit is bent or draped over the top of a receptacle, as described below, without the need for any additional devices to stiffen or protect the conduit 16. One suitable type of tubing is clear vinyl tubing with at least a 1/16 inch wall thickness. For example, if the barbed extension of port 32 has a ¼ inch outer diameter, the tubing may be vinyl tubing having a ⅜ inch outer diameter and a ¼ inch inner diameter, available from the OEM Division of Watts Regulator Company, 815 Chestnut Street, North Andover, Mass. 01845-6098, http://www.wattsreg.com/.

Figure 3A:
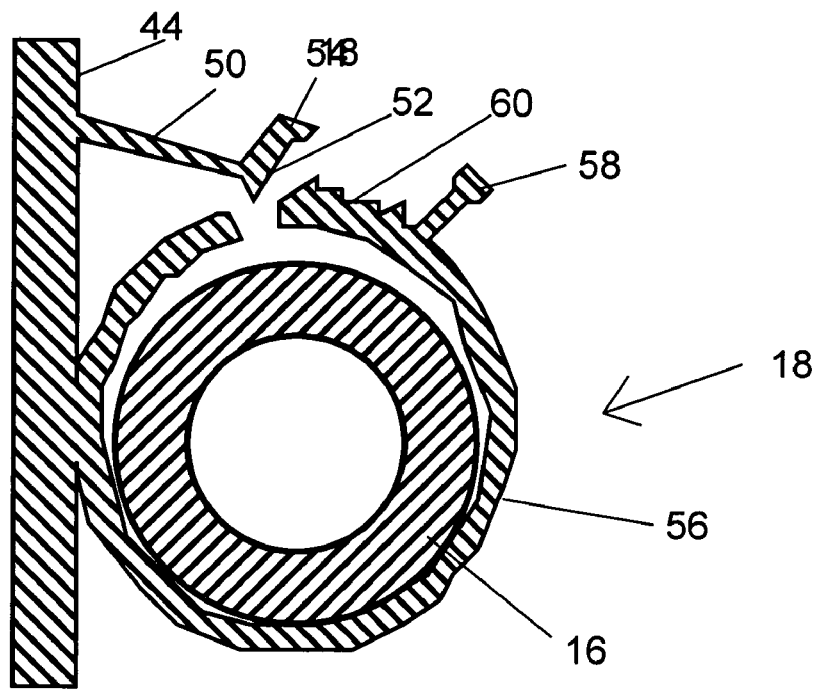
FIG. 3a shows the clip in an open position and FIG. 3b shows the clip in a closed position.
Figure 3B:
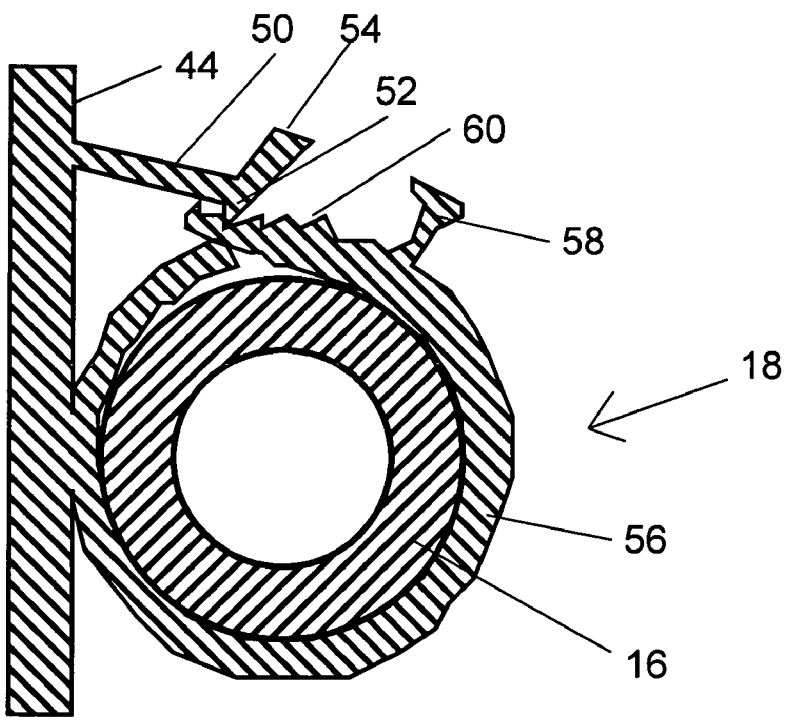

Attachment device or clip 18 is formed so that it can be adhered to a hard surface, such as the top or inside surface of a Christmas tree stand. Preferably, clip 18 is adjustable, so conduit 16 may be inserted into and removed easily from the clip during assembly and disassembly of kit 10, yet retained in position during use. One suitable type of clip is a Ratcheting Plastic Kwik Klip, available from Gardner Bender, 6100 N. Baker Road, Milwaukee, Wis. 53209, http://www.gardner-bender.com/. This ratcheting clip 18 has a clip base 44 with an adhesive foam backing 46 that is protected with a strip of paper or other peelable material 48 until the clip is to be installed for use. Clip 18 includes a gripping portion 50, molded to clip base 40, a ratchet 52, and a handle 54. Clip 18 also includes a retaining loop 56, also molded to clip base 44, a handle 58, and ratchet teeth 60. Retaining loop 56 is sized such that when ratchet 52 is not engaged with ratchet teeth 60, conduit 16 can pass easily through retaining loop 56, as shown in FIG. 3a, and when ratchet 52 engages ratchet teeth 60, conduit 16 can be held snugly in place without being compressed significantly, as shown in FIG. 3b.

It is desirable that the watering system formed with kit 10 is attractive when used in a location where it can be seen and easily accessed for filling with water. Thus, reservoir 12 and lid 14 may include features that enhance their appearance. For example, if the system is to be used for watering a Christmas tree, the exterior surfaces of reservoir 12 and lid 14 may be pre-assembled or imprinted with ribbons 20. Any decorative ribbon may be used, and the ribbon may be glued onto reservoir walls 26 using any suitable glue. Further, the exterior surfaces of reservoir 12 and lid 14 may have textured or decorated surfaces that resemble gift wrapping paper. Two small holes 62 and 64, sized and positioned to accommodate wires or ties 66 and 68, may pass through top portion 38 of lid 14 and through any decorative ribbon 20 mounted on lid 14.

Bow 22 may be formed from a ribbon material to resemble an ornamental bow such as the ones commonly used for decorating gift packages. Preferably, one or more wires or ties 66 and 68 are attached to bow 22, for use in securing bow 22 to lid 14, as described below.

The kit 10 can be assembled as shown in FIG. 4 for use with a Christmas tree 70. It should be noted that the following discussion describes use with a Christmas tree and stand, but the kit of the present invention could be used with any other type of plant and receptacle in which the plant is placed, preferably without the use of soil to anchor the plant. Clip 18 is mounted to stand 72, preferably on an interior surface of and near the top of a water receptacle 74. If clip 18 is provided in the kit with a protective backing over adhesive applied to base 44, the adhesive portion should be removed, and then gentle pressure can be applied to clip 18 to adhere the clip base 44 to the surface of stand 72, as shown in FIG. 4a. As shown in FIG. 1, the reservoir of kit 10 is pre-assembled with port 32. However, the reservoir and the port could be provided as separate pieces, in which case the port would be engaged into an opening in one of the reservoir walls, such as by gluing the port into the opening or by screwing an externally threaded port into an internally threaded opening (not shown).

Figure 4A:
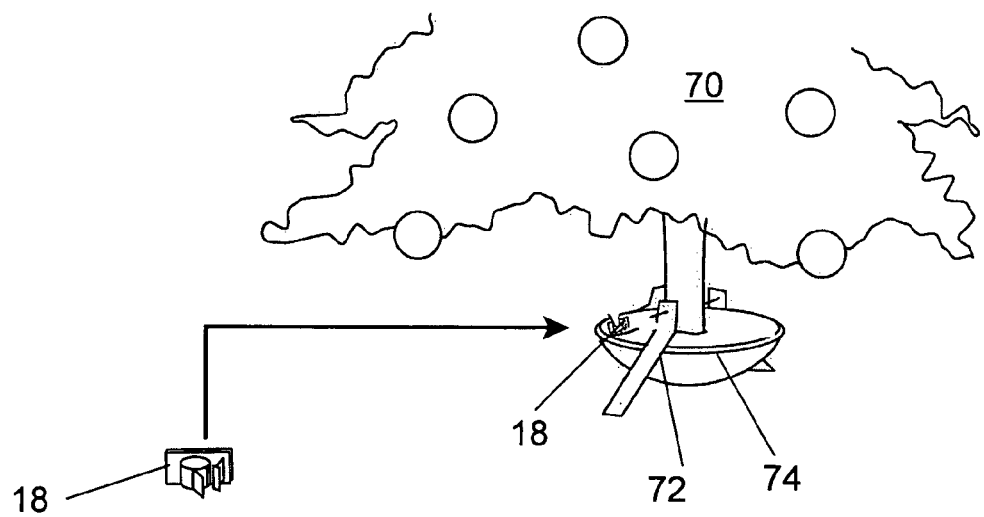
FIG. 4 is a perspective view showing steps a-e for assembly of the kit of FIG. 1.
Figure 4B:
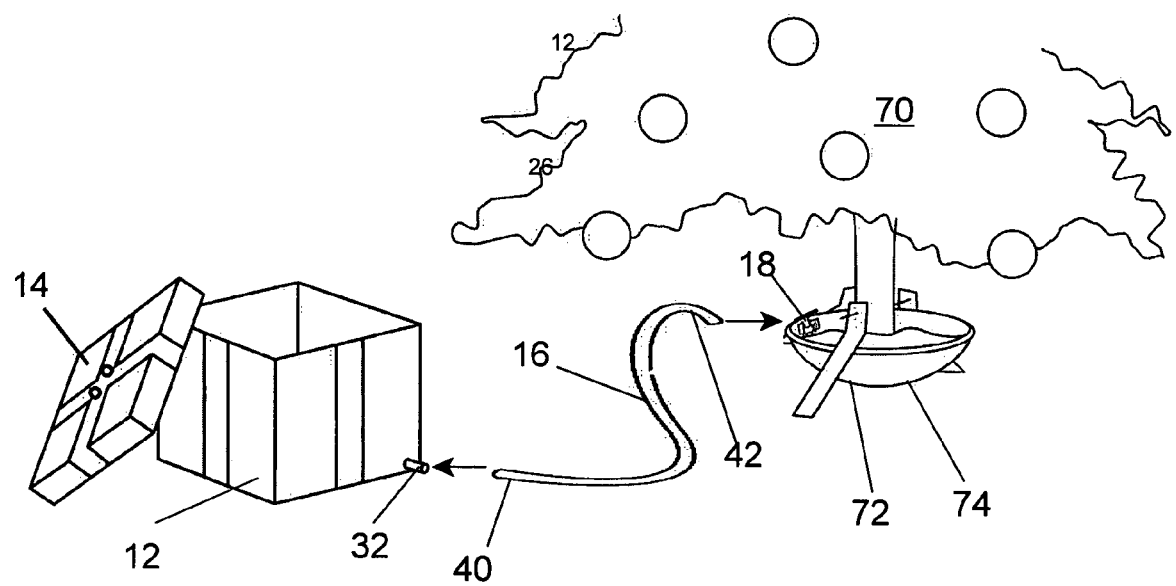
Figure 4C:
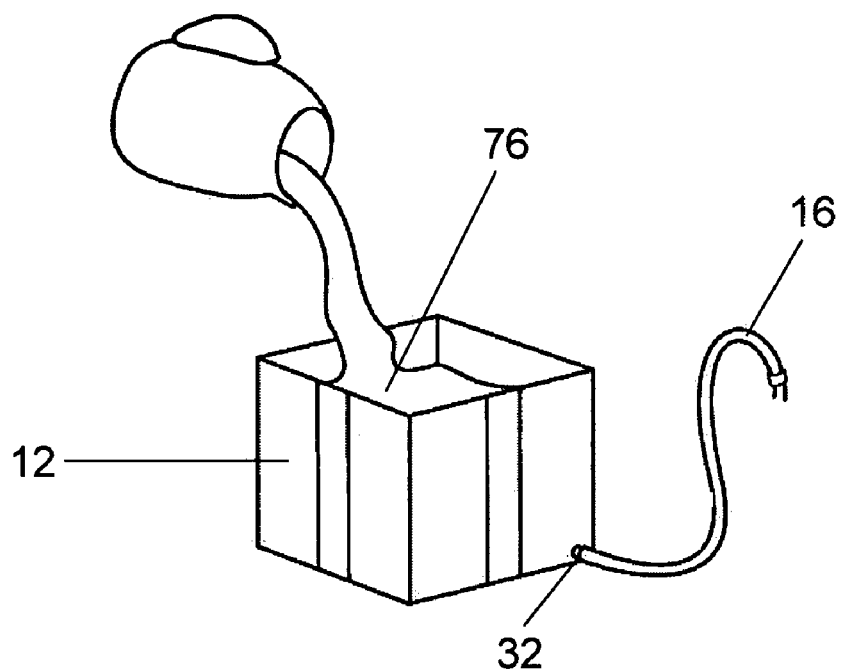

One end of conduit 16 is fixed around the port 32 of reservoir 12, as indicated in FIG. 4b. Preferably, port 32 and conduit 16 have outer and inner diameters, respectively, that allow first end 40 of conduit 16 to slide around port 32 yet fit tightly enough to provide a water-tight seal without the use of any additional sealants, hose clamps, or other sealing devices. Reservoir 12 is placed near the tree and receptacle 74, and second end 42 of conduit 16 is inserted into retaining loop 56 in clip 18 and positioned with end 42 at or near the bottom of receptacle 74, but without blocking the opening in the end 42 of conduit 16. Handles 54 and 58 are then squeezed toward each other to engage ratchet 50 with ratchet teeth 60 until conduit 16 is held snugly in place by retaining loop 56, as shown in FIG. 3b. Ideally, retaining loop 56 is snug enough to prevent conduit 16 from slipping through loop 56 while the watering system is in use, but not so snug that conduit 16 is pinched and fluid flow through the conduit 16 is impeded. Referring to FIG. 4c, water 76 or another liquid is poured into reservoir 12. Care should be taken to make sure that reservoir 12 is not filled to a level that will cause receptacle 74 to overflow, with a resulting spill. Instead of or in addition to water, another liquid may be supplied, such as a solution of fertilizer, a plant preservative, an algae inhibitor, or a slime inhibitor.

Figure 4D:
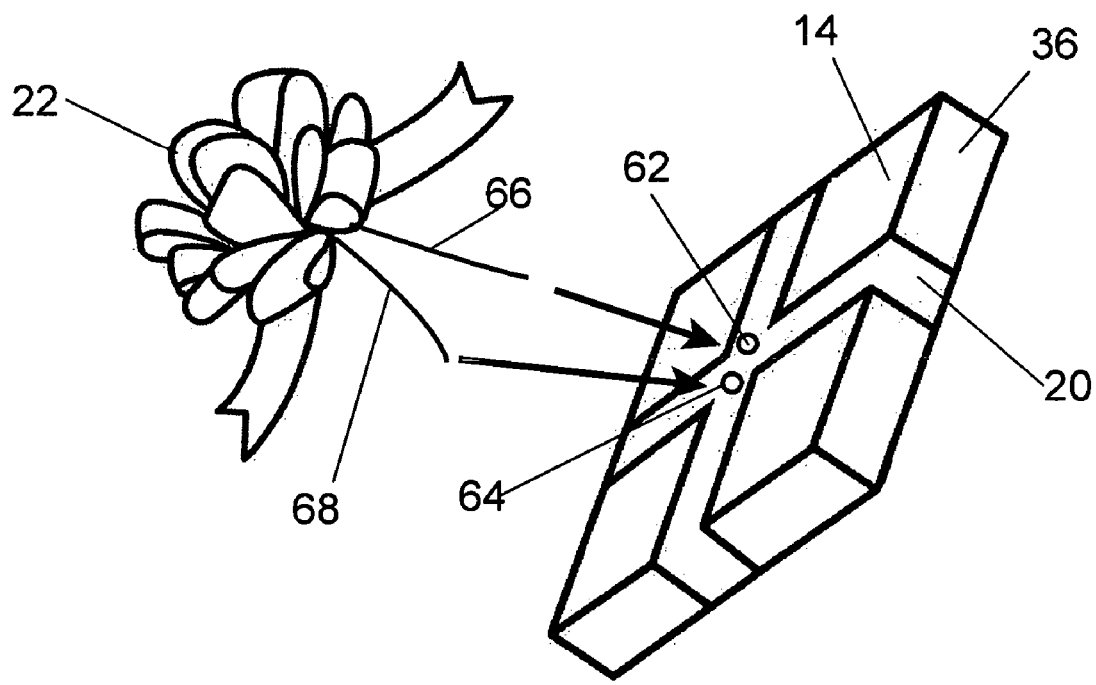
Figure 4E:
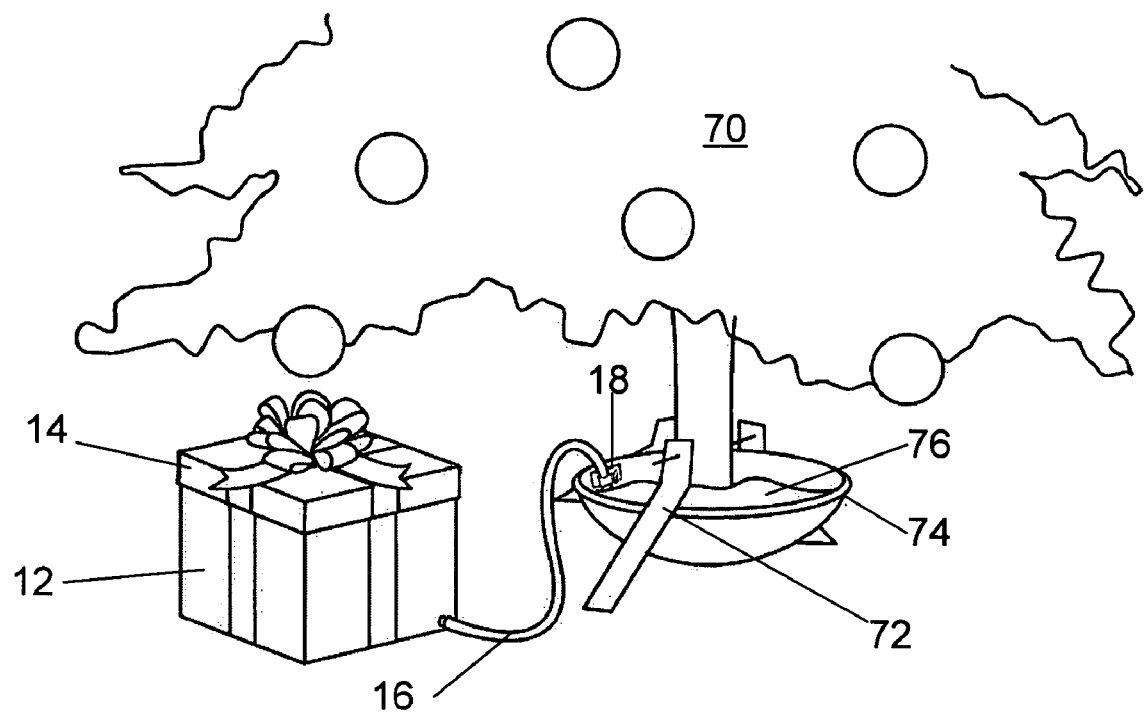

If desired, bow 22 may be attached to lid 14, as shown in FIG. 4d. For example, if bow 22 includes wires or ties 66 and 68 extending from its non-looped side, the wires or ties 66 and 68 may be inserted into holes 62 and 64 through decorative ribbon 20 and top portion 38 of lid 14, with bow 22 on the exterior surface of lid 14. Wires or ties 66 and 68 can then be twisted or tied together near the inside surface of lid 14 to secure bow 22 to lid 14. Instead of bow 22, another article suitable for decorating a gift may be attached in a similar manner. Lid 14 is then placed onto the top of reservoir 12 to cover the top opening 28, as shown in FIG. 4e.

Figure 5:
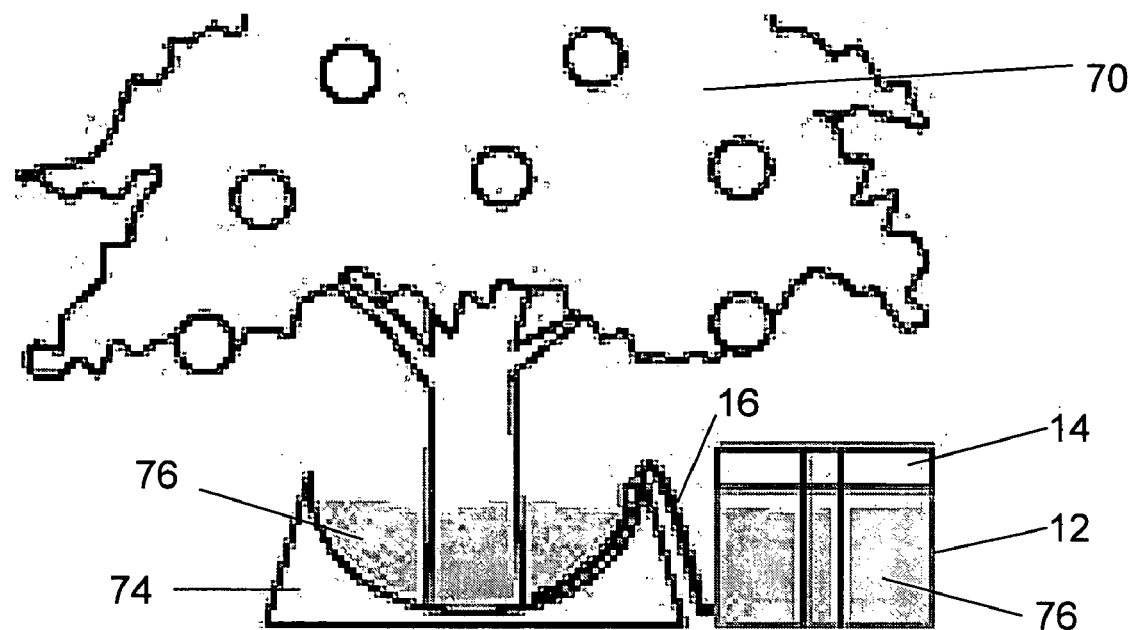
FIG. 5 is a partial cross section showing one manner of use for an apparatus in accordance with the present invention.
Figure 6:
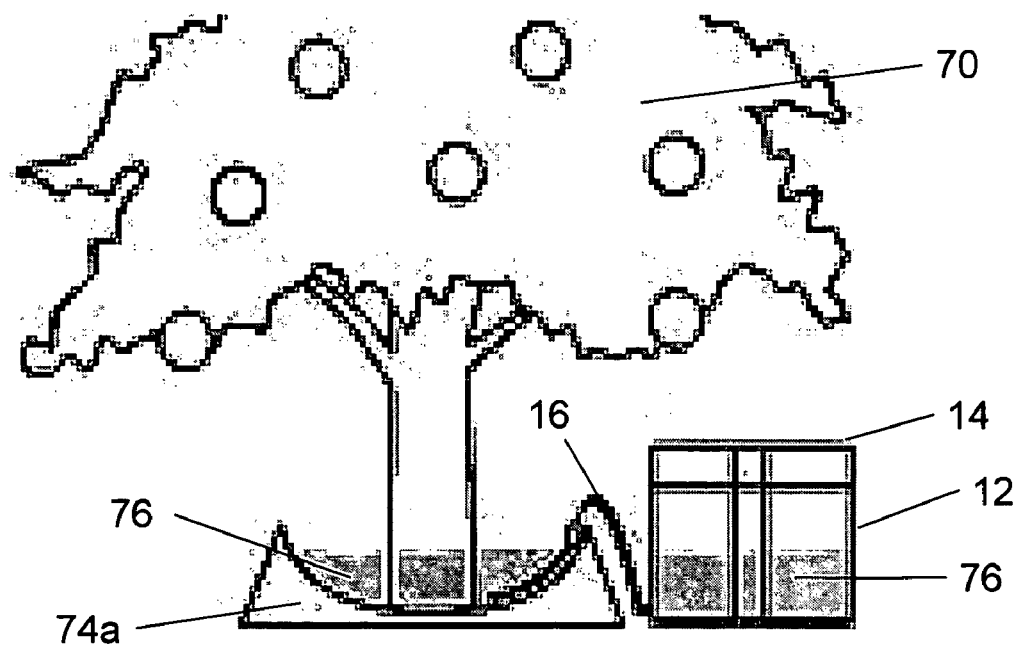
FIG. 6 is a partial cross section showing another manner of use for an apparatus in accordance with the present invention.
Figure 7:
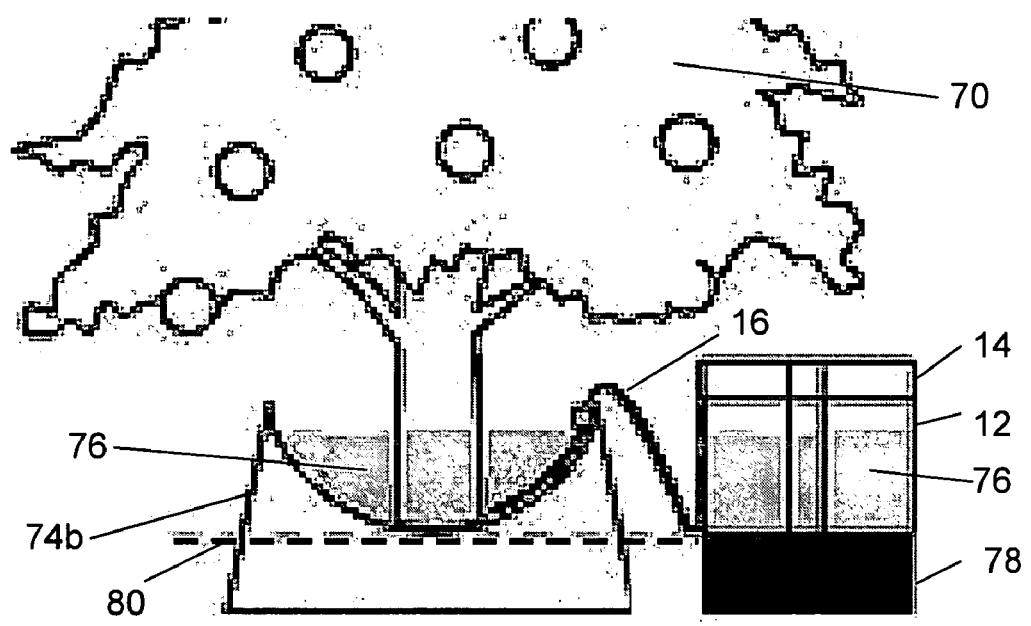
FIG. 7 is a partial cross section showing yet another manner of use for an apparatus in accordance with the present invention.

Referring to FIGS. 5, 6, and 7, it should be noted that if the watering system embodied in the assembled kit is to function properly, the water level in the reservoir 12 must be maintained between the height of the end 42 of conduit 16 in receptacle 74 and the top of receptacle 74. Thus, if it is to be used for an extended period of time, reservoir 12 must be refilled periodically. Ideally, it should be refilled as needed, perhaps every 4-8 days for a typical Christmas tree, with a reservoir about 9.5 inches by 9.5 inches by 7.75 inches and a reservoir capacity of seven to eight gallons. FIG. 5 shows a typical reservoir 74, with a height close to the height of reservoir 12. If the top of receptacle 74a is significantly lower than the top of reservoir 12, as shown in FIG. 6, care must be taken to avoid overfilling reservoir 12 to prevent receptacle 74a from overflowing. If the bottom of receptacle 74b is higher than opening 30 in reservoir 12, the reservoir can be placed on a riser 78, as shown in FIG. 7, to ensure maintenance of fluid flow between the two containers. Preferably, the bottom of the receptacle and the riser have approximately the same height, indicated by dashed line 80 in FIG. 7.

If reservoir 12 is filled to a height greater than the highest point in conduit 16, water will flow through conduit 16 into the receptacle 74, 74a, or 74b until the water levels in reservoir 12 and the receptacle are the same. If fluid flow between reservoir 12 and the receptacle is interrupted and the highest point in conduit 16 is higher than the fill height of water in reservoir 12, it may be necessary to temporarily elevate reservoir 12 to reestablish fluid flow through conduit 16 via a siphon. If the Christmas tree or other plant is to be maintained in the receptacle for an extended period of time, it may be desirable to add a fertilizer, plant preservative, algae inhibitor, slime inhibitor, or combination thereof to the reservoir.

Figure 8:
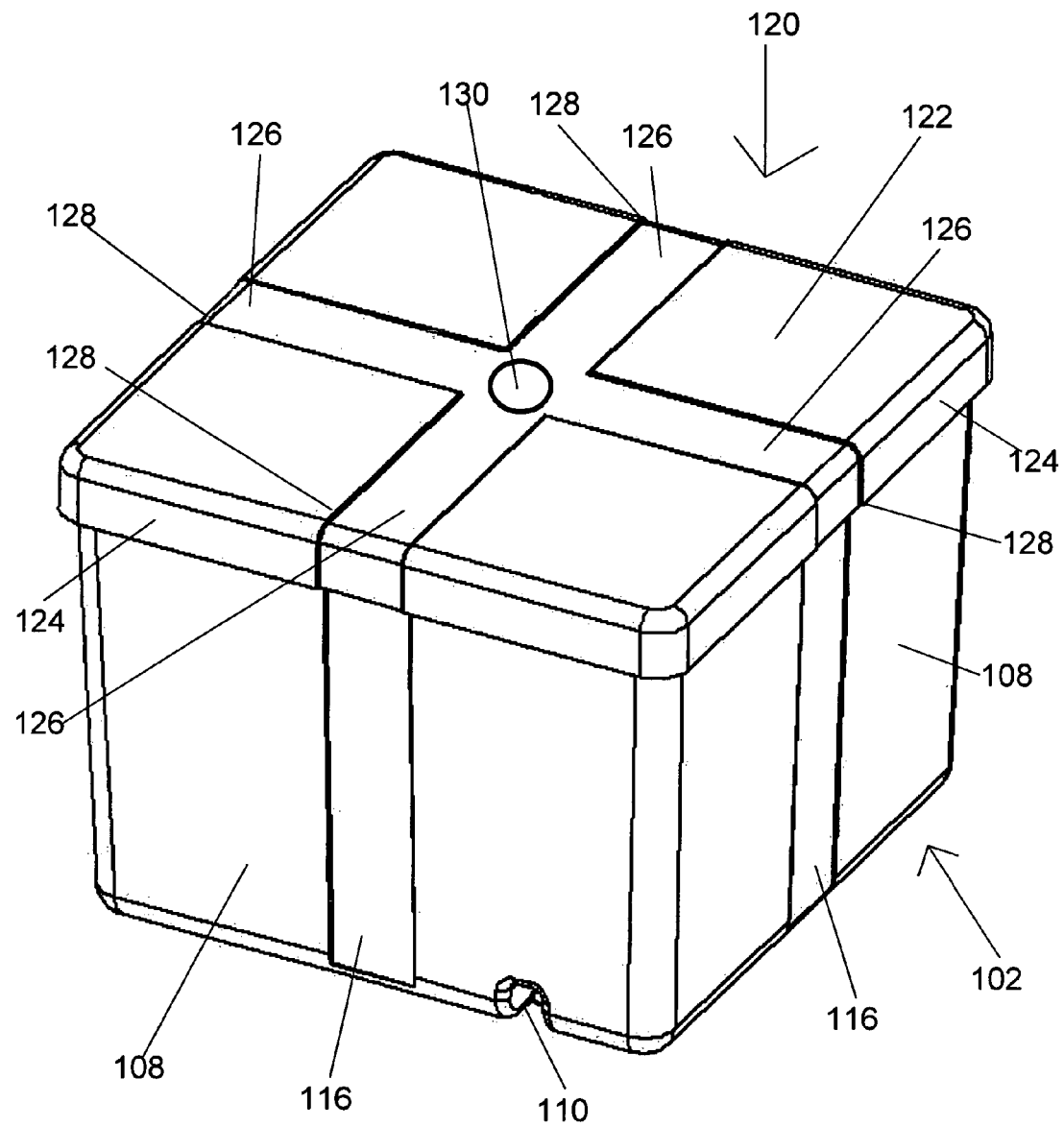
FIG. 8 is a perspective view of another embodiment of a reservoir in accordance with the present invention.
Figure 9:
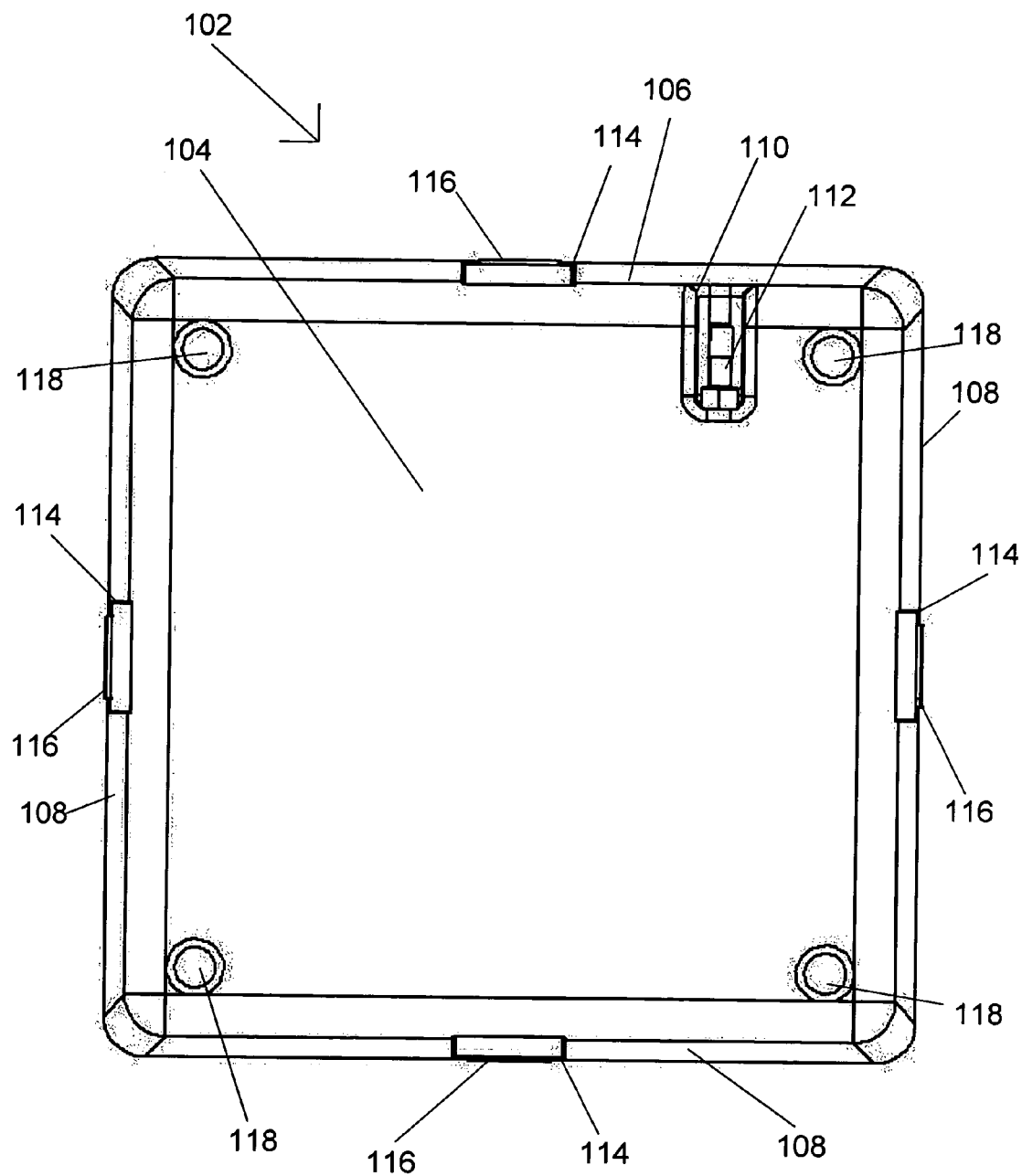
FIG. 9 is a plan view of the bottom of the reservoir of FIG. 8.

Another embodiment of a reservoir in accordance with the present invention can be understood with reference to FIGS. 8 and 9. Reservoir 102 includes a base 104 and walls 106 and 108. Walls 106 and 108 are angled outward slightly from base 104 as the walls 106 and 108 extend upward. Base 104 and wall 106 include a recess 110 into which an outlet port 112 is inserted. Outlet port 112 is sealed to the reservoir base and walls such that water can flow from the interior of the reservoir 102 through port 112. The exterior surfaces of walls 106 and 108 include grooves or recesses 114 into which decorative ribbon 116 is mounted, such as with glue. Base 104 also includes feet 118 that can support the reservoir on a surface, such as a floor.

Lid 120 fits onto the top portion of walls 106 and 108, with an upper cover 122 and side extensions 124 joined to cover 122. Ribbons 126 are mounted into grooves or recesses 128 in lid cover 122 and side extensions 124. Optionally, a piece of one side of a hook and loop type fastener 130 may be mounted onto lid 120, as shown, for use in attaching a bow or other decorative element using the other side of a hook and loop type fastener.

Preferably, base 104 and walls 106 and 108 are formed with recess 110 as an integral unit, such as by injection molding, and lid 120 is similarly formed by injection molding. In this case, the angles between each of walls 106 and 108 and base 104 should be slightly more than 90 degrees, as should the angles between the downward extensions 124 and the upper surface 122 of lid 120. Making these angles slightly larger than 90 degrees facilitates unmolding of the formed pieces during the injection molding process.

Reservoir 102 can be assembled with a conduit connected to port 112 and a means for retaining the second end of the conduit in a water receptacle, as explained above with respect to reservoir 12. When assembled and installed, reservoir 102 can be used in the same manner as reservoir 12.

The reservoirs and kit in accordance with the present invention are simple to manufacture and to assemble into a watering system in accordance with the present invention. The watering system formed with the kit is easy to assemble, use, disassemble, and store for future use. It is usable with a wide variety of plant containers and Christmas tree stands, and it is safe for use in areas with significant foot traffic because it creates no fire, electrical, or tripping hazards. Further, a watering system in accordance with the present invention is attractive and fits into a wide range of decorative environments.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents falling within the scope of the invention may be resorted to.

I claim:

1. A kit for an apparatus for delivering water to a plant supported in a receptacle, the kit comprising:
   a water-tight reservoir having a base, at least one wall joined to said base, and an open top;
   an outlet port passing from the interior to the exterior of said reservoir adjacent the joint between said wall and said base;
   a conduit having a first end for attaching to said outlet port and a second end;
   means for retaining said second end of said conduit within the receptacle when said reservoir is spaced apart from the receptacle;
   a lid for said reservoir;
   an ornament;
   means for removably attaching said ornament to said lid.

2. The kit of claim 1, wherein said ornament comprises a bow.

3. The kit of claim 1, wherein said means for removably attaching is selected from ties extending from said bow and corresponding holes through said lid, wherein said ties and the holes are sized so that said ties can easily pass through the holes; and hook and loop fasteners mounted to said bow and said lid.

4. An apparatus for delivering water to a plant in a receptacle, comprising:
   (A) a reservoir including a base and a surrounding wall extending upwardly from said base to terminate in an open top thereby to define an interior adapted to hold water;
   (B) an outlet port member disposed on said reservoir in fluid communication with the interior thereof, said outlet port member including an interior portion extending into the interior of said reservoir and an exterior portion projecting exteriorly thereof, said surrounding wall has a recess formed therein proximately to said base, said outlet port member being located within the recess such that said exterior portion does not protrude from the recess;
   (C) a flexible conduit including a first end portion adapted to telescopically receive the exterior portion of said outlet port member in fluid communication therewith and a second end portion opposite said first end portion;
   (D) a clip member adapted to secure to the receptacle and including a retaining loop operative to releasably mount at selected locations along the second end portion of said conduit whereby the second end portion may be secured to the receptacle; and
   (E) a lid adapted to mount on said reservoir and enclose the interior thereof when in a mounted state.

5. The apparatus according to claim 4 wherein said reservoir and said lid are configured and decorated to resemble a wrapped gift when in the mounted state.

6. A kit for an apparatus for delivering water to a plant supported in a receptacle, the kit comprising:
   a water-tight reservoir having a base, at least one wall joined to said base, and an open top, said reservoir including a recess formed therein adjacent the joint between said wall and said base;
   an outlet port disposed in the recess and passing from the interior to the exterior of said reservoir;
   a conduit having a first end for attaching to said outlet port and a second end;
   means for retaining said second end of said conduit within the receptacle when said reservoir is spaced apart from the receptacle; and
   a lid for said reservoir.

7. The kit of claim 6, wherein at least one of said reservoir and said lid has an exterior including features to make said reservoir resemble a wrapped gift.

8. The kit of claim 7, wherein said features are selected from patterns, textures, ribbons, and combinations thereof.

9. The kit of claim 6, further comprising an ornament, wherein said ornament and said lid include means for removably attaching said ornament to said lid.

10. The kit of claim 6, where said means for retaining comprises a base to which an adhesive has been applied.

11. The kit of claim 6, wherein said means for retaining comprises a clip having an adhesive surface for attachment to the receptacle and having a retaining loop sized to fit around the exterior of said conduit and hold said conduit in place without impeding fluid flow through said conduit.

12. The kit of claim 11, wherein said conduit has an outer diameter, and said retaining loop is adjustable between a first inner diameter larger than said outer diameter of said conduit and a second inner diameter approximately the same as said outer diameter of said conduit.

* * * * *